Figure 1:
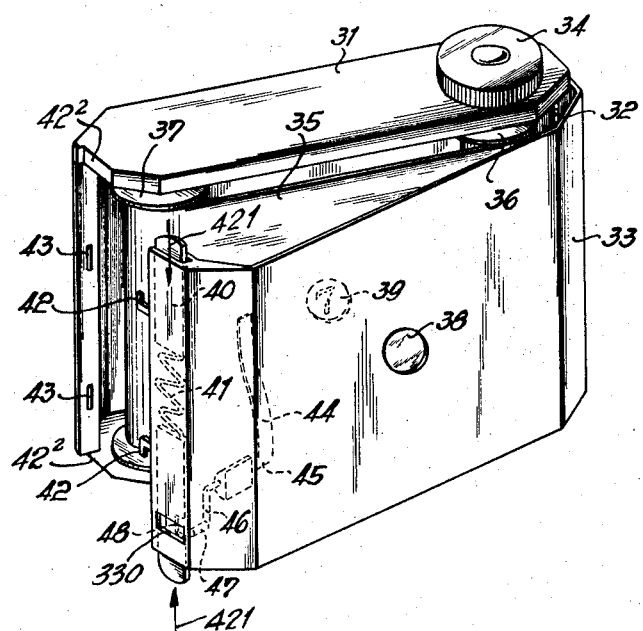

Sept. 15, 1959     H. NAUMANN     2,903,952

LOCKING MEANS FOR THE BACK WALL OF ROLL FILM CAMERAS

Original Filed Dec. 9, 1952

INVENTOR
HELMUT NAUMANN

BY *Mocker Blum*
ATTORNEYS

United States Patent Office 2,903,952
Patented Sept. 15, 1959

2,903,952

LOCKING MEANS FOR THE BACK WALL OF ROLL FILM CAMERAS

Helmut Naumann, Munich, Germany, assignor to Voigtlander, A.G., Braunschweig, Germany, a corporation of Germany Original application December 9, 1952, Serial No. 324,975, now Patent No. 2,771,825, dated November 27, 1956. Divided and this application August 23, 1956, Serial No. 605,871

1 Claim. (Cl. 95—31)

This invention relates to locking means for the back wall of roll film cameras, and more particularly to locking means of this type, which prevent opening or removal of the camera back wall as long as sensitive film lies freely within the camera.

In many photographic cameras, it cannot be directly seen from the outside whether the camera contains a film, or not. In roll film cameras containing a film and its paper roll, the presence of numbers which are printed on the paper and visible through the red window, indicates the presence of a film in the camera. However, there will be no clear indication of this type if the number is inadvertently shifted from the area of the window, because it is difficult to see the film through the red window in the absence of a printed symbol. In miniature cameras, in which the film is used without a paper roll, winding of the film is necessary in order to find out whether the supply spool is rotated simultaneusly and this can be seen in recent camera constructions from the outside. If winding of the film is locked, a blank exposure must be made. This picture counting mechanism does not give, in general, clear information on the presence of a film in the camera. In view of these uncertainties, the camera if often opened erroneously and valuable pictures may then be lost by the action of light. Similar damage may be caused if a camera containing a film is opened inadvertently or by unauthorized persons.

It has been suggested previously to use locking means for the rear wall of roll film cameras in order to prevent plainly inadvertent opening of the camera. These locking means try to increase attentiveness by the use of certain signs or the like. They cannot prevent opening, so that errors and mistakes are not eliminated by them.

The above described disadvantages are overcome according to the present invention by installing in the camera a device which prevents removal of or opening the camera back wall as long as the sensitive film lies freely in the camera, either because it is not completely exposed or because it has not been wound back yet to the film holder.

The device according to the present invention consists of a locking means which is directly or indirectly actuated or controlled by the film or by an element moved together with the film. The main part of the device according to the invention is a contact member which is arranged articulately or elastically on the camera body or the camera back wall and is held by the film, which is in position for exposure, in a first position which is different from the position of said member in the empty camera. In said first position, said contact member locks the camera back wall so that it cannot be directly opened. while in said other position of the contact member the back wall is released for opening. However, the arrangement contains locking means acting in one way in such manner that the back wall can be closed when a film is inserted in the camera. Therefore, said locking means, or an element connected therewith, has preferably such design, e.g. the form of a pawl, that the camera back wall can be closed, but not opened, when the camera contains a film.

Actuation of the locking means can take place at any part of the camera. For example, locking can be effected by a film portion adjacent to or on the take up spool or supply spool.

Furthermore, it is possible to effect locking by means of a member actuated by the film. For example, the locking means may comprise a tongue elastically fastened to the camera casing, said tongue being provided with a contact element lying laterally against the film surface and with an aperture. Upon swinging to the locking position, said tongue prevents opening of the back wall by engaging with its aperture a locking pin, whereby an inclined flap provided on the tongue permits closing of the back wall, but not its opening after engagement of the aperture by the pin, when the camera contains a film.

According to another embodiment, the locking device includes a contact lever which is rotatable about an axis parallel with the direction of movement of the film, said lever lying against the rear side of the film and being adapted to lock at least one locking bolt of the camera back wall by means of a second lever and a cam.

In a further embodiment of the invention, the member locking the back wall is not controlled directly by the film, but by another camera element, the position of which is unequivocally and positively dependent on the film, e.g. the picture counting device. In this embodiment, a contact member bears preferably against a drum connected with the picture counting device, said contact member being adapted to lock the camera back wall as long as the picture counter is not at zero, i.e. when a film is in the camera, while a recess in the drum surface permits release of locking when the camera is empty and the counter indicates "0."

The invention also includes an additional device, which can be actuated by hand and actuation of which under exceptional conditions renders locking inactive if the camera containing a film must be opened, e.g. in order to remove part of the film in the dark room, or if—irrespective of the loss of exposed films—opening of the camera is necessary in order to eliminate some trouble. However, according to the invention, this additional device cannot be actuated directly and needs the use of an auxiliary means or tool, e.g. a screw driver, pin, coin, or the like.

In using such additional device, a lever, which can be turned by means of a slotted head from the outside, may be fastened to the inner surface of the back wall, said lever being adapted to temporarily render locking inactive, by means of a pawl-like member arranged on the locking tongue, e.g. an inclined starting surface. According to another embodiment, contact lever and locking lever can be arranged in such manner that they can be displaced along their common axis of rotation, against the action of a spring, to a non-locking position, by means of a tool acting from the outside.

In some motion-picture cameras locking means have been used, which permits opening of the camera by means of a coin. However, these known devices are not dependent in their operation in any way on the position of the film or on the presence of a film in the camera. They are mechanical locks and have nothing to do with the release of a locking device.

It is useful to indicate the position of the contact member on the outside of the closed camera, in order to indicate whether the camera contains a film. In conventional miniature cameras this could be recognized only by causing transport of the film and observing the back winding knob or other outwardly projecting parts of the film transporting mechanism.

Some embodiments of the invention are diagrammatically illustrated in the appended drawings and described in the following examples, to which the invention is not limited. Details which are not necessary for the understanding of the invention have been omitted in these examples and the drawings.

Figure 2:
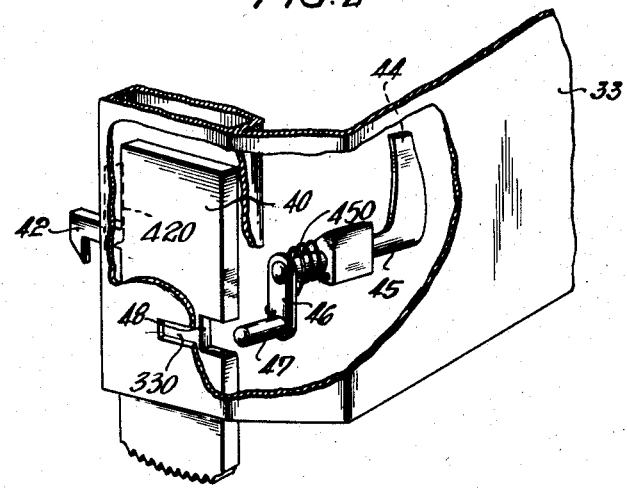

In the drawings, Figure 1 illustrates a roll film camera with an open folding back wall; Figure 2 illustrates in perspective view, on an enlarged scale, the locking mechanism of the camera shown in Figure 1.

Referring now to the drawings in detail, Figures 1 and 2 illustrate use of the invention in a roll film camera having a hinged back wall which can be snapped open as shown in Figure 1. Camera 31, shown in Figure 1 in rear view, is provided with a back wall 33 connected with the camera by means of hinge 32. 34 denotes a rotatable knob for causing transport of the film 35 and the supporting paper layer of the film. 36 is the take-up spool, 37 denotes the supply spool and 38 denotes the usually red-colored window provided in the back wall of the camera for viewing the symbols printed on the paper strip of the film. In conventional manner, the back wall can be closed by two flap-shaped locking elements 40, which are provided on the narrow side of the back wall and are pressed apart by the action of spring 41. Said locking means 40 are each provided with a hook 42 adapted to engage recesses 43 provided in the camera. As indicated in Fig. 2, hooks 42 extend through recesses 420 of the back wall 33. The length of recesses 420 determines the range of movement of members 40. Recesses 420 are arranged relative to recesses 43 provided in camera 31, in such a manner that—when members 40 are caused by hand to move against the effect of spring 41 in the direction of arrows 421—hooks 42 can enter recesses 43. If then members 40 are released, spring 41 forces them again to the position shown in the drawing, in which hooks 42 by their noses lockingly extend into recesses 43 and thus hold the back wall 33 in closed position. Recesses or cut out portions 42² are provided in the top and bottom end walls of the camera body to accommodate the ends of the members 40 to permit the spring 41 to expand and engage hooks 42 in their associate recesses. The locking means according to the invention comprises a contact lever 44, which is shown in dotted line in Figure 1, is arranged behind back wall 33 and rotatable about axis 45. This axis carries a second lever 46 provided with a tooth 47. In the empty camera, lever 44 is pressed, by a spring 450, shown in Fig. 2 into the space for spool 37 and tooth 47 is removed from recess 48 of locking means 40, so that said locking means can be operated. Upon inserting a film in the camera and closing the camera, lever 44 is pressed by the film against the plane of the back wall, tooth 47 engages recess 48 and thus prevents operation of locking means 40 and opening of the camera.

Lever 44 can be provided with additional means or have a design suitable for supporting flat position of the film. In order to eliminate the effect of the locking device under exceptional circumstances, tooth 47 can be pressed back in the direction of the camera back wall through a hole 330 provided in the outer wall of part 33, by means of a pointed tool, e.g. a pencil or a match, so that locking means 40 can be operated subsequently.

A device of the type here described can be applied also to film counting devices, the graduated disc of which is operated by a step by step control device and can be set by hand when the camera is loaded. In this case, the camera can be opened in loaded condition after the counter has been set to "0" so that particular means for opening the camera under exceptional conditions, are not necessary.

It will be understood that devices according to the invention, which are controlled by the film counter, can be applied also to cameras having a hinged back wall.

It will be also understood that this invention is not limited to the specific elements, arrangements and other specific details described above and illustrated in the drawings and can be carried out with various modifications without departing from the scope of the invention as defined in the appended claim.

Reference is made to my co-pending application, Serial No. 324,975, filed December 9, 1952, now United States Patent No. 2,771,825 dated November 27, 1956, for "Locking Means for the Back Wall of Roll Film Cameras," of which this is a division.

What is claimed is:

In a photographic camera having a back wall hinged to the camera body; a latching device for holding said back wall in closed position; said latching device comprising two latches which are slidably arranged in said back wall, a spring for urging said latches apart from each other, said latches being provided with hook means for engaging registering means provided in the camera body; said camera having a locking device for preventing operation of said latching device; said locking device comprising a first, contact lever which is connected with a second lever adapted to engage a latch of the latching device; said first, contact lever being held in closed position of the back wall, by film inserted in the camera, in a position, in which said second lever engages and locks a latch of the latching device.

References Cited in the file of this patent

UNITED STATES PATENTS

| 1,389,164 | Roikjer | Aug. 30, 1921 |
| 2,489,957 | Davis | Nov. 29, 1949 |

FOREIGN PATENTS

| 823,031 | France | Oct. 4, 1937 |